(12) United States Patent
Park et al.

(10) Patent No.: US 11,978,886 B2
(45) Date of Patent: May 7, 2024

(54) METHOD FOR PREPROCESSING LITHIUM METAL FOR LITHIUM SECONDARY BATTERY

(71) Applicant: LG CHEM, LTD., Seoul (KR)

(72) Inventors: Intae Park, Daejeon (KR); Doo Kyung Yang, Daejeon (KR); Jeehyun Ahn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 930 days.

(21) Appl. No.: 16/971,180

(22) PCT Filed: Jul. 16, 2019

(86) PCT No.: PCT/KR2019/008769
§ 371 (c)(1),
(2) Date: Aug. 19, 2020

(87) PCT Pub. No.: WO2020/022690
PCT Pub. Date: Jan. 30, 2020

(65) Prior Publication Data
US 2021/0104732 A1  Apr. 8, 2021

(30) Foreign Application Priority Data
Jul. 25, 2018 (KR) ........................ 10-2018-0086474

(51) Int. Cl.
*H01M 4/1395* (2010.01)
*H01M 4/04* (2006.01)
(Continued)

(52) U.S. Cl.
CPC ....... *H01M 4/1395* (2013.01); *H01M 4/0447* (2013.01); *H01M 4/382* (2013.01);
(Continued)

(58) Field of Classification Search
CPC .. H01M 4/1395; H01M 4/0447; H01M 4/382; H01M 10/0525; H01M 10/058; H01M 10/44
See application file for complete search history.

(56) References Cited

U.S. PATENT DOCUMENTS

| 8,870,979 B2 | 10/2014 | Bouillon |
| 2010/0181528 A1 | 7/2010 | Richardson |

(Continued)

FOREIGN PATENT DOCUMENTS

| CN | 105264695 A | 1/2016 |
| CN | 105612636 A | 5/2016 |

(Continued)

OTHER PUBLICATIONS

Gireaud et al., "Lithium Metal Stripping/Plating Mechanisms Studies: A Metallurgical Approach," Electrochemistry Communications, vol. 8, Issue 10, 2006, pp. 1639-1649 (Year: 2006).*

(Continued)

*Primary Examiner* — Ula C Ruddock
*Assistant Examiner* — Olivia Mason Ruggiero
(74) *Attorney, Agent, or Firm* — Birch, Stewart, Kolasch & Birch, LLP

(57) ABSTRACT

A method for pre-treating lithium metal for a lithium secondary battery including stripping a surface oxide film formed on a surface of the lithium metal by discharging the battery, and a plating lithium metal on the surface of the lithium metal, from which the surface oxide film has been stripped, by charging the battery.

9 Claims, 2 Drawing Sheets

(51) Int. Cl.
*H01M 4/38* (2006.01)
*H01M 10/0525* (2010.01)
*H01M 10/058* (2010.01)
*H01M 10/44* (2006.01)

(52) U.S. Cl.
CPC ..... *H01M 10/0525* (2013.01); *H01M 10/058* (2013.01); *H01M 10/44* (2013.01)

(56) References Cited

U.S. PATENT DOCUMENTS

| | | | |
|---|---|---|---|
| 2014/0174935 A1 | 6/2014 | Sakakibara et al. | |
| 2014/0197797 A1 | 7/2014 | Yamazaki | |
| 2015/0010822 A1 | 1/2015 | Nakahara et al. | |
| 2015/0107989 A1 | 4/2015 | Tateno | |
| 2016/0133931 A1 | 5/2016 | Kim et al. | |
| 2016/0218357 A1 | 7/2016 | Yoshikawa et al. | |
| 2016/0276672 A1 | 9/2016 | Song et al. | |
| 2017/0133662 A1 | 5/2017 | Cui et al. | |
| 2018/0301693 A1 | 10/2018 | Choi et al. | |
| 2018/0337394 A1 | 11/2018 | Matsui et al. | |
| 2019/0003073 A1 | 1/2019 | Kasuya et al. | |

FOREIGN PATENT DOCUMENTS

| | | |
|---|---|---|
| CN | 105917497 A | 8/2016 |
| EP | 3054505 A1 | 8/2016 |
| JP | 61-285667 A | 12/1986 |
| JP | 11-297362 A | 10/1999 |
| JP | 2010-267487 A | 11/2010 |
| JP | 2011-60539 A | 3/2011 |
| JP | 5289595 B2 | 9/2013 |
| JP | 2014-187002 A | 10/2014 |
| JP | 5854009 B2 | 2/2016 |
| JP | 6302203 B2 | 3/2018 |
| JP | 2018-190658 A | 11/2018 |
| JP | 2018-19557 A | 12/2018 |
| KR | 10-2015-0059820 A | 6/2015 |
| KR | 10-2017-0137876 A | 12/2017 |
| KR | 10-2018-0036600 A | 4/2018 |
| KR | 10-2018-0108807 A | 10/2018 |
| WO | WO 2013/118659 A1 | 8/2013 |
| WO | WO 2016/168723 A1 | 10/2016 |

OTHER PUBLICATIONS

Gireaud et al., "Lithium metal stripping/plating mechanisms studies: A metallurgical approach", Electrochemistry Communications, 2006, vol. 8, pp. 1639-1649.
International Search Report (PCT/ISA/210) issued in PCT/KR2019/008769 mailed on Oct. 24, 2019.
Lin et al., "Three-dimensional stable lithium metal anode with nanoscale lithium islands embedded in ionically conductive solid matrix", PNAS, May 2, 2017, vol. 114, No. 18, pp. 4613-4618.
Markevich et al., "Very Stable Lithium Metal Stripping-Plating at a High Rate and High Areal Capacity in Fluoroethylene Carbonate-Based Organic Electrolyte Solution", ACS Energy Letters, 2017, vol. 2, pp. 1321-1326.
Ryou et al., "Mechanical Surface Modification of Lithium Metal: Towards Improved Li Metal Anode Performance by Directed Li Plating", Advanced Functional Materials, 2014, vol. 25, No. 6, pp. 834-841.
Extended European Search Report, dated Apr. 28, 2021, for European Application No. 19839866.1.

\* cited by examiner

[Figure 1]
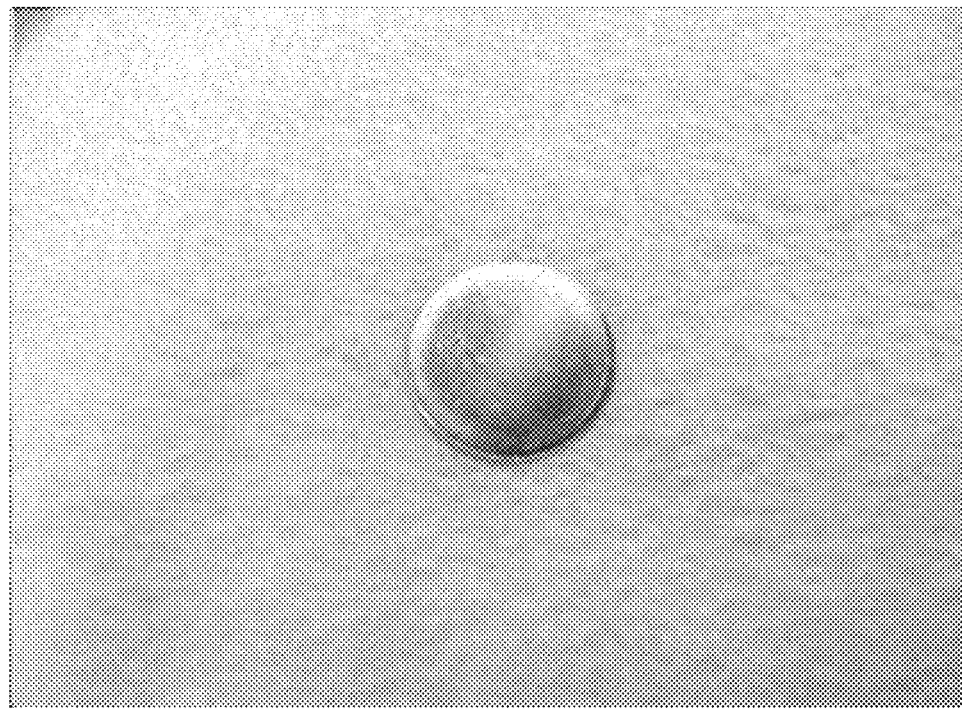
[Figure 2]
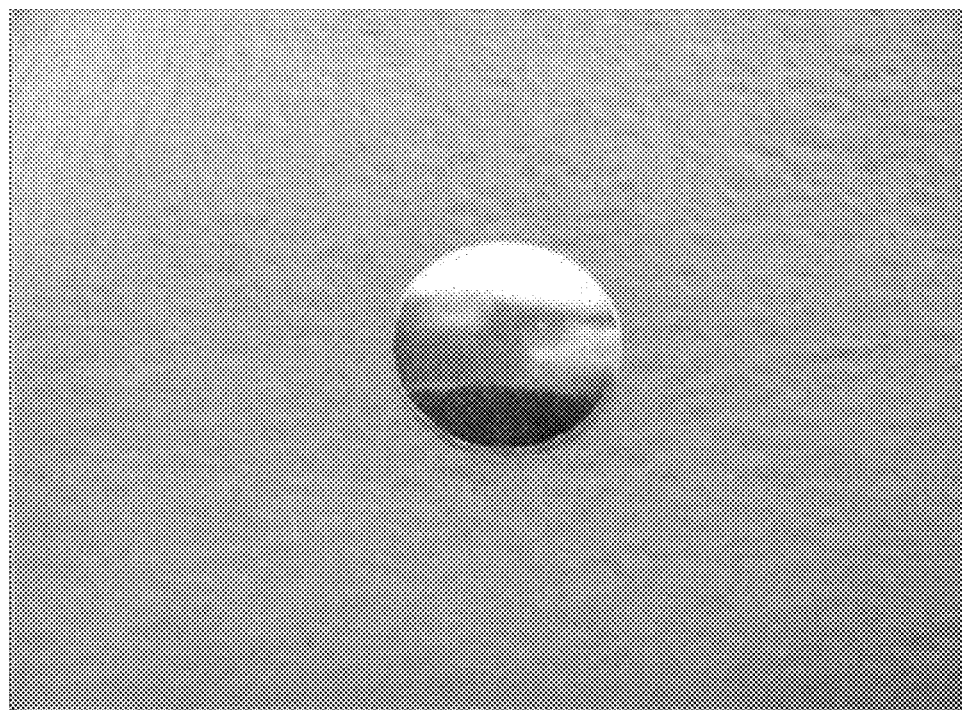

[Figure 3]
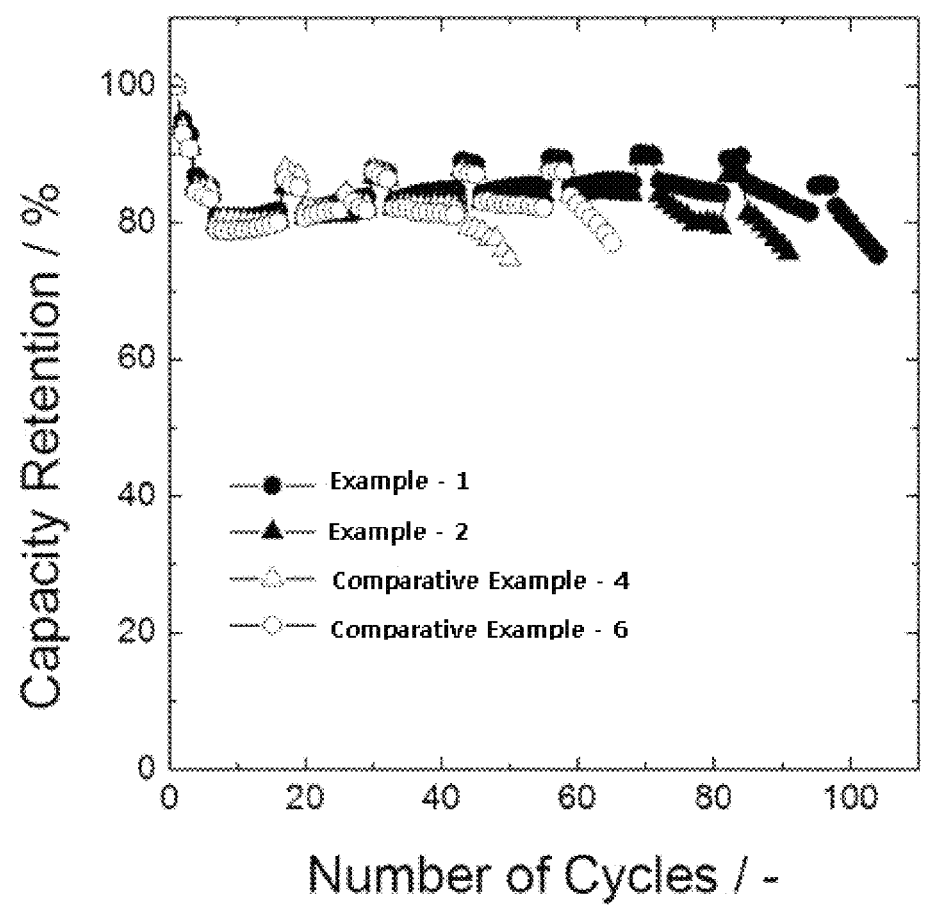

METHOD FOR PREPROCESSING LITHIUM METAL FOR LITHIUM SECONDARY BATTERY

TECHNICAL FIELD

This application claims the benefit of priority based on Korean Patent Application No. 10-2018-0086474, filed on Jul. 25, 2018, all contents of which are incorporated herein by reference.

The present invention relates to a method for pre-treating lithium metal for a lithium secondary battery. More particularly, the present invention relates to a method for pre-treating lithium metal for a lithium secondary battery comprising a stripping step and a plating step as an electrochemical polishing technique.

BACKGROUND ART

As technology development and demand for mobile devices are increasing, demand for secondary batteries as an energy source is rapidly increasing. Among such secondary batteries, lithium secondary batteries which exhibit high energy density and operating potential and have low self-discharge rate are commercially available.

The lithium metal secondary battery is the first commercially available lithium secondary battery, which uses lithium metal as a negative electrode. However, lithium metal secondary batteries were discontinued only a few years after they were commercialized, due to the volume expansion of the cell, the gradual decrease in capacity and energy density, the short circuit by continuous growth of dendrite, the reduced cycle life, and the problem of cell stability (explosion and ignition) by the lithium dendrite formed on the surface of lithium metal negative electrode. Therefore, instead of lithium metal, a carbon-based negative electrode which is more stable and can store lithium in a grid or void space in the ionic state was used. Commercialization and dissemination of lithium secondary batteries have progressed in earnest by the use of the carbon-based negative electrode.

Up to now, the lithium secondary battery is mainly composed of carbon-based or non-carbon-based negative electrode materials, and the development of most negative electrode materials is concentrated on carbon-based (graphite, hard carbon, soft carbon, etc.) and non-carbon-based (silicon, tin, titanium oxide, etc.) materials. However, the carbon-based materials have a theoretical capacity of not exceeding 400 mAh/g, and the non-carbonaceous materials are materials with a theoretical capacity greater than 1000 mAh/g, but have problems of volume expansion and performance degradation during charging and discharging.

On the other hand, in recent years, medium- or large-sized lithium secondary batteries have been activated, and accordingly, high capacity and high energy density characteristics are required, but existing carbon-based or non-carbon-based negative electrode materials have limitations in meeting this performance.

Therefore, recently, researches for reusing lithium metal as in the lithium-air battery have been actively conducted, and at the same time, interest in lithium metal secondary batteries is on the rise again. Lithium is very light and has the potential to achieve excellent energy densities above the theoretical capacity of 3800 mAh/g.

However, there are many problems to be overcome in order to apply lithium metal as a negative electrode material of a secondary battery. First, in the case of lithium metal, the volume change is large in the course of the reaction and low efficiency characteristics can be exhibited due to side reactions with the electrolyte. In order to solve these problems, a research is underway to improve the efficiency of lithium metal by developing and applying an in-situ SEI layer or an ex-situ passivation layer for the protection of lithium metal.

In addition, a surface oxide film (native layer) such as $Li_2O$ and $Li_2CO_3$ can be naturally formed on the surface of lithium metal. Due to the presence of such surface oxide films, non-uniform reaction occurs on the surface of lithium metal during the reaction process, resulting in low efficiency characteristics. In order to control these problems, it is possible to induce a uniform reaction on the surface of lithium metal by physically removing the surface oxide film using a mechanical polishing technique as shown in Non-Patent Document 1 below. However, such a mechanical polishing technique is high likely to cause a secondary problem in that the surface of the lithium metal is unevenly formed in the brushing process itself, or re-oxidization occurs in the process of assembling the battery. Therefore, there is a need in the art for a new technique capable of efficiently removing the surface oxide film by compensating for the drawbacks of the mechanical polishing technique.

PRIOR ART DOCUMENT

Non-Patent Document (Non-Patent Document 1) Ryou, M. H. et al., Mechanical Surface Modification of Lithium Metal: Towards Improved Li Metal Anode Performance by Directed Li Plating, Adv. Funct. Mater., 2015, 25, 834-841.

DISCLOSURE

Technical Problem

In order to solve the above problems, the present invention is intended to provide a method for pre-treating lithium metal, which can effectively remove the surface oxide film naturally formed on the negative electrode, lithium metal by using the electrochemical polishing technique through the charging/discharging of the battery in a state that the lithium secondary battery was assembled.

Technical Solution

According to a first aspect of the present invention, the present invention provides a method for pre-treating lithium metal for a lithium secondary battery comprising stripping a surface oxide film from a surface of the lithium metal by discharging the battery and plating lithium metal on the surface of the lithium metal, from which the surface oxide film has been stripped, by charging the battery.

In one embodiment of the present invention, during stripping, the battery is discharged at a current density of 5 $mA/cm^2$ to 20 $mA/cm^2$.

In one embodiment of the present invention, during stripping, the discharging of the battery is performed 1 time to 13 times for a time period of 20 seconds to 120 seconds each time.

In one embodiment of the present invention, during stripping, the battery is discharged in a range of $6.0 \times 10^{-4}$ to $3.0 \times 10^{-2}$ of the ECPS factor value represented by the following Equation 1.

$$\text{ECPS factor}(mA/cm^2/s/n^2) = \text{current density}(mA/cm^2)/\text{time period}(s)/\text{number of times }(n))^2. \quad [\text{Equation 1}]$$

In one embodiment of the present invention, during plating, the battery is charged at a current density of 0.01 mA/cm² to 0.2 mA/cm².

In one embodiment of the present invention, during plating, the battery is charged 1 time to 13 times for a time period of 1,000 seconds to 7,000 seconds each time.

In one embodiment of the present invention, when the stripping and the plating are performed two or more times, the stripping and the plating are alternatively and sequentially performed in the same number of times.

In one embodiment of the present invention, a ratio of a current density during discharging during stripping and a current density during charging during plating is 50:1 to 200:1.

In one embodiment of the present invention a ratio of the ECPP factor value during discharging during stripping and the ECPP factor value during charging during plating is 1.3:1 to 1:1.3, and the ECPP factor value is expressed by the following Equation 2.

$$\text{ECPP factor}(mA \cdot s/cm^2) = \text{current density}(mA/cm^2) \cdot \text{time period}(s). \quad \text{[Equation 2]}$$

According to a second aspect of the present invention, the present invention provides a lithium secondary battery containing lithium metal pre-treated by the above-described method for pre-treating lithium metal.

Advantageous Effects

According to the method of pre-treating lithium metal according to the present invention, since the pre-treatment is performed after the battery is assembled, it is possible to fundamentally prevent the problem of re-oxidation of lithium metal that may occur after pre-treatment. In addition, since the method is not a mechanical or chemical method, damage of the lithium metal by the apparatus or the reagent does not occur, and if the stripping step and the plating step are properly adjusted, a uniform surface of lithium metal can be formed after pre-treatment.

DESCRIPTION OF DRAWINGS

FIG. 1 is an image showing a photograph of the pre-treated lithium metal after lithium metal was pre-treated according to Example 1.

FIG. 2 is an image showing a photograph of the pre-treated lithium metal after lithium metal was pre-treated according to Comparative Example 5.

FIG. 3 is a graph showing lifetime characteristics of lithium secondary batteries in which the pre-treatment process for lithium metal was performed according to Examples 1 and 2 and Comparative Examples 4 and 6, respectively.

BEST MODE

The embodiments provided in accordance with the present invention can be all achieved by the following description. It is to be understood that the following description sets forth preferred embodiments of the present invention and that the present invention is not necessarily limited thereto.

The present invention provides a method for effectively removing a surface oxide film such as $Li_2O$ or $Li_2CO_3$ that is naturally formed on the lithium metal used as a negative electrode material in a lithium secondary battery. In the present invention, since the negative electrode material of the lithium secondary battery is limited to lithium metal, the lithium secondary battery of the present specification can be interpreted as a lithium metal secondary battery. The surface oxide film can be formed naturally as lithium metal exposed to air reacts with oxygen or carbon dioxide. If a lithium metal with a thick surface oxide film is applied to a lithium secondary battery, the uniform reaction on the surface of the lithium metal can be inhibited. Therefore, when lithium metal in a state that the surface oxide film was removed is applied to a lithium secondary battery, the lithium secondary battery may be advantageous in terms of life characteristics.

Conventionally, a mechanical polishing technique and a chemical polishing technique have been mainly used as a method for removing a surface oxide film from lithium metal. This technique is performed using mechanical devices or chemical reagents, but this technique cannot be performed when lithium metal has already been applied to a lithium secondary battery. Therefore, when the conventional mechanical polishing technique and the chemical polishing technique are used, it is inevitable that the lithium metal is re-oxidized during the assembling process of the battery. In addition, since conventional mechanical polishing techniques and chemical polishing techniques are difficult to precisely control with micro or nano scale, the surface of lithium metal may be unevenly formed even after the process or the lithium metal may be lost. In contrast, since the method according to the present invention is performed in a state that lithium metal was applied to the lithium secondary battery, the problem of re-oxidization of lithium metal does not occur, and since the operation of releasing the surface oxide film on the lithium metal and the operation of attaching lithium metal are sequentially performed, the loss of lithium metal can be minimized.

Method for Pre-Treating Lithium Metal

The present invention provides a method for pre-treating lithium metal, which uniformly removes a surface oxide film formed on the surface of lithium metal using an electrochemical polishing technique before the full-scale operation of the lithium secondary battery. The method for pre-treating lithium metal according to the present invention largely comprises a stripping step and a plating step. The stripping step and the plating step may be performed two or more times, respectively, and it is preferable that the stripping step and the plating step are sequentially and alternately performed in the same number of times, but the present invention is not limited thereto. Hereinafter, the stripping step and the plating step will be described in detail.

First, the stripping step is a step of removing the surface oxide film formed on the lithium metal, which is performed by discharging the lithium secondary battery. When discharging the lithium secondary battery, since the surface oxide film as well as the exposed lithium metal can be removed together, it is important to set the discharging condition to an appropriate range in order to uniformly remove the surface oxide film and minimize the loss of the lithium metal. According to an embodiment of the present invention, the stripping step may be performed by discharging the battery at a current density of 5 to 20 mA/cm², preferably 8 to 16 mA/cm². If the battery is discharged at a current density of less than 5 mA/cm² in the stripping step, the removal effect of the surface oxide film may be insignificant, and it is difficult to uniformly remove the surface oxide film. If the battery is discharged at a current density exceeding 20 mA/cm² in the stripping step, lithium metal can be removed together and it is difficult to uniformly remove the surface oxide film. According to an embodiment of the present invention, the stripping step may be performed by discharging the battery 1 time to 13 times, preferably 3 times to 10 times for a time period of 20 to 150 seconds each, preferably 30 to 120 seconds each. If the battery is discharged in a time period of less than 20 seconds in the stripping step, the removal effect of the surface oxide film may be insignificant, and if the battery is discharged for a time period of more than 150 seconds, lithium metal may be removed together, which is undesirable. Also, if the stripping step is performed 14 times or more, the loss of lithium metal may be accelerated, which is undesirable.

Since the removal of the surface oxide film, which is the object of the present invention, is substantially caused by the stripping step, the stripping step may be more important than the plating step. As described above, when discharging the battery in the stripping step, setting the conditions such as current density, time period, and number of times can greatly affect the results, wherein individual settings of each condition as well as organic settings can be important. In the present invention, when discharging the battery in the stripping step, the electrochemical polishing stripping (ECPS) factor value expressed by the following Equation 1 is introduced to define the organic relation of current density, time period, and number of times.

$$\text{ECPS factor}(mA/cm^2/s/n^2) = \text{current density } (mA/cm^2)/\text{time period}(s)/(\text{number of times}(n))^2. \qquad \text{[Equation 1]}$$

According to Equation 1, the ECPS factor value is a value obtained by dividing current density by time period and square of number of times. In embodiments of the present invention, the stripping step is performed by discharging the battery in the range of $6.0 \times 10^{-4}$ to $3.0 \times 10^{-2}$, preferably $6.5 \times 10^{-4}$ to $1.5 \times 10^{-2}$ of the ECPS factor value represented by the above Equation 1. If the ECPS factor value is set outside the above range, the removal effect of the surface oxide film is insignificant, or a large amount of lithium metal is removed together with the surface oxide film, which is undesirable.

The plating step is a step of replenishing lithium metal on the lithium metal from which the surface oxide film is removed by the stripping step, which is performed by charging the lithium secondary battery. When the lithium metal is replenished by the plating step, since the surface oxide film on the lithium metal is completely removed, and the exposed portion thereby can be replenished preferentially, even if the reaction proceeds unevenly in the stripping step, the plating step can compensate for this. The plating step can be performed at a low current density for a long time compared to the stripping step. When the reaction proceeds slowly on this wise, a more uniform surface of lithium metal can be obtained. In an embodiment of the present invention, the plating step can be performed by charging the battery at a current density of 0.01 to 0.2 mA/cm², preferably 0.04 to 0.16 mA/cm². If the battery is charged at a current density of less than 0.01 mA/cm² in the plating step, the replenishment amount of lithium metal is insufficient or the replenishment rate of lithium metal is decreased, which is undesirable. If the battery is charged at a current density exceeding 0.2 mA/cm² in the plating step, it is difficult to uniformly fill the surface of the non-uniform lithium metal formed by the stripping step or the surface oxide film, which is undesirable. According to an embodiment of the present invention, the plating step is performed by charging the battery 1 to 13 times, preferably 3 to 10 times for a time period of 1,000 to 7,000 seconds, preferably 3,000 to 6,000 seconds. If the battery is charged in the plating step for less than 1,000 seconds, the replenishment effect of lithium metal may be insignificant. If the battery is charged for more than 7,000 seconds, the overall pre-treatment process is too slow to be practical. Also, if the plating step is performed 14 times or more, the lithium metal lost by the stripping step is not efficiently replenished, which is undesirable.

Although the plating step is performed independently of the stripping step, it may be more appropriate to adjust the conditions of the plating step considering the conditions of the stripping step. According to an embodiment of the present invention, the ratio of the current density during discharging in the stripping step and the current density during charging in the plating step may be 50:1 to 200:1. When performing the stripping step and the plating step within the above range, it is possible to obtain a lithium metal having a uniform surface after the pre-treatment while efficiently removing the surface oxide film. In the present invention, an electrochemical polishing plating (ECPP) factor value expressed by the following Equation 2 is introduced to define the relationship between the current density and the time period in the stripping step and the current density and the time period in the plating step.

$$\text{ECPP factor}(mA \cdot s/cm^2) = \text{current density}(mA/cm^2) \cdot \text{time period}(s). \qquad \text{[Equation 2]}$$

According to equation 2, the ECPP factor value refers to a value obtained by multiplying the current density by the time period. According to an embodiment of the present invention, the ratio of the ECPP factor value during discharging in the stripping step and the ECPP factor value during charging in the plating step may be 1.3:1 to 1:1.3. If the stripping step and the plating step are performed within the above range, the balance between the stripping step and the plating step can be suitably adjusted.

If the method for pre-treating lithium metal according to the present invention is applied, since about 90 wt. % or more of lithium metal as compared with the first lithium metal before the formation of the surface oxide film can be obtained, and the obtained lithium metal in the state where the surface oxide film is completely removed can be applied directly to the lithium secondary battery, the lifetime characteristics and the like of lithium secondary battery can be improved.

Lithium Secondary Battery

Since the method for pre-treating lithium metal as described above is performed after the assembly of the lithium secondary battery, it can be affected by the configuration of the lithium secondary battery. The lithium secondary battery to which the method for pre-treating lithium metal according to the present invention is applicable is not particularly limited as long as the negative electrode is a lithium metal. Hereinafter, each configuration of the lithium secondary battery will be described in more detail.

The lithium secondary battery to which the method for pre-treating lithium metal according to the present invention is applicable comprises a negative electrode; a positive electrode; a separator disposed between the negative electrode and the positive electrode; and an electrolyte. The negative electrode of the lithium secondary battery is limited to lithium metal. The present invention relates to a pre-treatment method for removing a surface oxide film formed on lithium metal.

The positive electrode is not particularly limited, but may be a lithium thin film or an electrode having a positive electrode active material layer formed on one side of a current collector. If the positive electrode is an electrode having a positive electrode active material layer formed on one side of a current collector, the positive electrode may be prepared by applying a slurry of a positive electrode active material containing a positive electrode active material on one side of a current collector and then drying the slurry. In this case, the slurry may further comprise additives such as binders and electrically conductive materials, fillers, and dispersants in addition to the positive electrode active material.

The positive electrode active material is not particularly limited, but may be, for example, a sulfur-based active material, a manganese-based spinel active material, a lithium metal oxide, or a mixture thereof. Specifically, the sulfur-based compound may be $Li_2S_n$ (n≥1), an organic sulfur compound or a carbon-sulfur polymer (($C_2S_x)_n$: x=2.5~50, n≥2). The lithium metal oxide may be a lithium-manganese-based oxide, a lithium-nickel-manganese-based oxide, a lithium-manganese cobalt-based oxide, a lithium-nickel-manganese-cobalt-based oxide and the like. Specifically, the positive electrode active material may be $LiCoO_2$, $LiNiO_2$, $LiMnO_2$, $LiMn_2O_4$, $Li(Ni_aCo_bMn_c)O_2$ (wherein 0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (wherein 0≤y<1), $Li(Ni_dCo_eMn_f)O_4$ (wherein 0<d<2, 0<e<2, 0<f<2, d+e+f=2), $LiMn_{2-z}Ni_zO_4$, or $LiMn_{2-z}Co_zO_4$ (wherein 0<z<2).

The binder is a component that assists in bonding between the positive electrode active material and the electrically conductive material and bonding to the current collector, and may typically be added in an amount of 1 wt. % to 30 wt. % based on the total amount of the slurry of the positive electrode active material. The binder is not particularly limited, but may be, for example, at least one selected from the group consisting of polyvinylidene fluoride-hexafluoropropylene copolymer (PVDF-co-HFP), polyvinylidene fluoride, polyacrylonitrile, polymethyl methacrylate, polyvinyl alcohol, carboxymethylcellulose (CMC), starch, hydroxypropyl cellulose, regenerated cellulose, polyvinyl pyrrolidone, tetrafluoroethylene, polyethylene, polypropylene, polyacrylic acid, ethylene-propylene-diene monomer (EPDM), sulfonated-EPDM, styrene-butadiene rubber (SBR), fluorine rubber, and the mixture thereof.

The electrically conductive material is not particularly limited, but may be for example, graphites such as natural graphite or artificial graphite; carbon blacks such as carbon black (super-p), acetylene black, Ketjen black, channel black, furnace black, lamp black, thermal black, and Denka black; electrically conductive fibers such as carbon fiber or metal fiber; carbon fluoride; metal powders such as aluminum and nickel powder, electrically conductive whiskers such as zinc oxide and potassium titanate; electrically conductive metal oxides such as titanium oxide; or electrically conductive materials such as polyphenylene derivatives. The electrically conductive material may typically be present in an amount of 0.05 wt. % to 10 wt. % based on the total weight of the slurry of the positive electrode active material.

The filler is a component for inhibiting the expansion of a positive electrode. The filler may be used or not, depending on necessity, and is not particularly limited as long as it is a fibrous material without causing chemical changes in the battery, and examples thereof may include olefinic polymers such as polyethylene and polypropylene; fibrous materials such as glass fibers and carbon fibers.

The dispersing agent (dispersion) is not particularly limited, but may be, for example, isopropyl alcohol, N-methylpyrrolidone (NMP), acetone and the like.

The coating can be performed by a method commonly known in the art, but can be performed, for example, by distributing a slurry of positive electrode active material on one side of the positive electrode current collector and then uniformly dispersing the slurry using a doctor blade or the like. In addition, the coating can be performed by a method such as die casting, comma coating, screen printing and the like.

The drying is not particularly limited, but may be performed within one day in a vacuum oven at 50° C. to 200° C.

The separator is a physical separator having a function of physically separating an electrode, which can be used without any particular limitations as long as it is used as a conventional separator. The separator is particularly preferable as long as it has excellent ability to impregnate the electrolytic solution while exhibiting a low resistance to the movement of ions in the electrolyte.

In addition, the separator enables the lithium ion to be transported between the positive electrode and the negative electrode while separating or insulating the positive electrode and the negative electrode from each other. The separator may be made of a porous, nonconductive or insulating material having a porosity of 30 to 50%.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used, and a nonwoven fabric made of glass fiber having high melting point or the like can be used. Among them, the porous polymer film is preferably used.

If the polymer film is used for both the buffer layer and the separator, the impregnation amount and ion conduction characteristics of the electrolyte solution are decreased and the effect of reducing the overvoltage and improving the capacity characteristics becomes insignificant. On the contrary, if the nonwoven fabric material is used for both the buffer layer and the separator, a mechanical stiffness cannot be ensured and thus a problem of short circuit of the battery occurs. However, if a film-type separator and a polymer nonwoven fabric buffer layer are used together, the mechanical strength can also be ensured together with the improvement effect of the battery performance due to the adoption of the buffer layer.

According to one preferred embodiment of the present invention, the ethylene homopolymer (polyethylene) polymer film is used as a separator, and the polyimide nonwoven fabric is used as a buffer layer. In that case, the polyethylene polymer film preferably has a thickness of 10 to 25 μm and a porosity of 40 to 50%.

The electrolyte solution is a nonaqueous electrolyte solution containing a lithium salt, which is composed of a lithium salt and a solvent.

The lithium salt is a substance which can be easily dissolved in a non-aqueous organic solvent, and may be, for example, at least one selected from the group consisting of LiCl, LiBr, LiI, $LiClO_4$, $LiBF_4$, $LiB_{10}Cl_{10}$, $LiB(Ph)_4$, $LiC_4BO_8$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, $LiN(C_2F_5SO_2)_2$, $LiN(SO_2F)_2$, lithium chloroborane, lithium lower aliphatic carboxylate, lithium tetraphenyl borate, and lithium imide. In one embodiment of the present invention, the lithium salt may preferably be lithium imide.

The concentration of the lithium salt may be 0.1 to 8.0 M, preferably 0.5 to 2.0 M depending on various factors such as the exact composition of the electrolyte solution mixture, the solubility of the salt, the conductivity of the dissolved salt, the charge and discharge conditions of the battery, the operating temperature and other factors known in the lithium secondary battery field. If the concentration of the lithium salt is less than the above range, the conductivity of the electrolyte solution may be lowered and thus the performance of the battery may be deteriorated. If the concentration of the lithium salt exceeds the above range, the viscosity of the electrolyte solution may increase and thus the mobility of the lithium ion (Lit) may be reduced. Accordingly, it is preferable to select an appropriate concentration of the lithium salt within the above range.

The non-aqueous organic solvent is a substance capable of dissolving a lithium salt well, and preferably, aprotic organic solvents such as N-methyl-2-pyrrolidone, propylene carbonate, ethylene carbonate, butylene carbonate, dimethyl carbonate, diethyl carbonate, ethylmethyl carbonate, gamma -butyrolactone, 1,2-dimethoxyethane, 1,2-diethoxyethane, 1-ethoxy-2-methoxyethane, diethylene glycol dimethyl ether, triethylene glycol dimethyl ether, tetraethyleneglycol dimethylether, tetrahydrofuran, 2-methyl tetrahydrofuran, dimethylsulfoxide, 1,3-dioxolane, 4 methyl-1, 3-dioxane, dimethylether, diethylether, formamide, dimethylformamide, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate can be used atone or in a mixed solvent form of two or more solvents thereof. In one embodiment of the invention, the aprotic solvent may preferably be dioxolane, dimethyl ether, or a combination thereof.

The nonaqueous electrolyte solution for the lithium-sulfur battery of the present invention may further contain nitric acid or a nitrous acid-based compound as an additive. The nitric acid or a nitrous acid-based compound has the effect of forming a stable film on the lithium electrode and improving the charging/discharging efficiency. The nitric acid or nitrous acid-based compound is not particularly limited in the present invention, but may be at least one selected from the group consisting of inorganic nitric acid or nitrous acid-based compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), ammonium nitrite ($NH_4NO_2$); organic nitric acid or nitrous acid-based compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite; organic nitro compounds such as nitromethane, nitropropane, nitrobutane, nitrobenzene, dinitrobenzene, nitropyridine, dinitropyridine, nitrotoluene, dinitrotoluene, and combinations thereof, and preferably may be lithium nitrate.

In addition, the non-aqueous electrolyte solution may further comprise other additives for the purpose of improving charging/discharging characteristics, flame retardancy, and the like. Examples of the additives may be pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, fluoroethylene carbonate (FEC), propene sultone (PRS), and vinylene carbonate (VC).

The lithium secondary battery of the present invention can be manufactured by disposing a separator between a positive electrode and a negative electrode to form an electrode assembly and inserting the electrode assembly into a cylindrical battery case or a rectangular battery case, and then injecting an electrolyte. Alternatively, the lithium secondary battery of the present invention can be manufactured by laminating the electrode assembly, impregnating the electrode assembly with the electrolyte, putting the obtained result into a battery case and then sealing it.

The battery case may be one that is commonly used in the art, and is not limited in appearance depending on the use of the battery. The battery case may be, for example, a cylindrical shape using a can, a rectangular shape, a pouch shape, a coin shape, or the like.

The lithium secondary battery according to the present invention can be used not only in a battery cell used as a power source of a small device, but also as a unit battery in a medium and large-sized battery module comprising a plurality of battery cells. Preferable examples of the above medium and large-sized devices may comprise, but are not limited to, electric vehicles, hybrid electric vehicles, plug-in hybrid electric vehicles, electric power storage systems, and the like.

Hereinafter, preferred examples will be described in order to facilitate understanding of the present invention. However, the following examples are provided to facilitate understanding of the present invention, but the present invention is not limited thereto.

EXAMPLES

Manufacture of Lithium Secondary Battery

The lithium secondary battery used in the following example is manufactured in the following manner.

While using water as a solvent, sulfur, Super-P (SP), an electrically conductive material, and a binder were mixed with a ball mill to prepare a composition for forming a positive electrode active material layer. In this case, Denka black was used as an electrically conductive material, and a mixture of SBR and CMC was used as a binder. The mixing ratio was sulfur and SP (9:1 ratio):electrically conductive material:binder of 90:10:10 in weight ratio. The composition for forming the positive electrode active material layer was coated on an aluminum current collector and dried to produce a positive electrode (energy density of positive electrode: 2.5 mAh/d).

The prepared positive electrode and negative electrode were positioned to face each other, and then interposed a polyethylene separator having a thickness of 20 μm and a porosity of 45% between the positive electrode and the negative electrode.

Thereafter, a lithium secondary battery was manufactured by injecting the electrolyte into the case. In that case, the electrolyte was prepared by dissolving 1 M lithium bis (trifluoromethylsulfonyl)imide (LiTFSI) and 1 wt. % $LiNO_3$ in an organic solvent composed of dioxolane (DOL) and dimethyl ether (DME) (mixing volume ratio=1:1).

Example 1

The lithium secondary battery was discharged at a current density of 8 mA/cm$^2$ for 60 seconds to strip the surface oxide film, and then charged at a current density of 0.08 mA/cm$^2$ for 6,000 seconds to plate lithium metal. The charging/discharging process was repeated 10 times in order to complete the pre-treatment process of lithium metal.

Examples 2 to 7

The pre-treatment process of lithium metal was completed in the same manner as in Example 1, except that the current density, time period, and number of times were adjusted as shown in Table 1 below.

Comparative Examples 1 to 5

The pre-treatment process of lithium metal was completed in the same manner as in Example 1, except that the current density, time period, and number of times were adjusted as shown in Table 1 below.

Comparative Example 6

The pre-treatment process of lithium metal according to the present invention was not performed.

TABLE 1

|  | Stripping step | | Plating step | | |
| --- | --- | --- | --- | --- | --- |
|  | Current density (mA/cm²) | Time period (s) | Current density (mA/cm²) | Time period (s) | Number of times (n) |
| Example 1 | 8.0 | 60 | 0.08 | 6,000 | 10 |
| Example 2 | 8.0 | 60 | 0.08 | 6,000 | 5 |
| Example 3 | 8.0 | 60 | 0.08 | 6,000 | 3 |
| Example 4 | 12.0 | 40 | 0.08 | 6,000 | 10 |
| Example 5 | 8.0 | 30 | 0.04 | 6,000 | 10 |
| Example 6 | 16.0 | 30 | 0.08 | 6,000 | 10 |
| Example 7 | 8.0 | 120 | 0.16 | 6,000 | 10 |
| Comparative Example 1 | 2.67 | 180 | 0.08 | 6,000 | 10 |
| Comparative Example 2 | 8.0 | 180 | 0.24 | 6,000 | 10 |
| Comparative Example 3 | 8.0 | 240 | 0.32 | 6,000 | 10 |
| Comparative Example 4 | 8.0 | 60 | 0.08 | 6,000 | 15 |
| Comparative Example 5 | 8.0 | 60 | 0.08 | 6,000 | 20 |

The above-mentioned ECPS factor and ECPP factor value are calculated based on the information shown in Table 1, and shown in Table 2 below.

TABLE 2

|  | Stripping step | | Plating step |
| --- | --- | --- | --- |
|  | ECPS factor (mA/cm²/s/n²) | ECPP factor (mA · s/cm²) | ECPP factor (mA · s/cm²) |
| Example 1 | 0.00133 | 480 | 480 |
| Example 2 | 0.00533 | 480 | 480 |
| Example 3 | 0.0148 | 480 | 480 |
| Example 4 | 0.003 | 480 | 480 |
| Example 5 | 0.00267 | 240 | 240 |
| Example 6 | 0.00533 | 480 | 480 |
| Example 7 | 0.000667 | 960 | 960 |
| Comparative Example 1 | 0.000148 | 480 | 480 |
| Comparative Example 2 | 0.000444 | 1,440 | 1,440 |
| Comparative Example 3 | 0.000333 | 1,920 | 1,920 |
| Comparative Example 4 | 0.000593 | 480 | 480 |
| Comparative Example 5 | 0.000333 | 480 | 480 |

Experimental Examples

Experimental Example 1

The recovery ratio of lithium metal after pre-treatment of lithium metal was measured and shown in Table 3 below. The recovery ratio of lithium metal is calculated by the following Equation 3.

Recovery ratio of lithium metal(%)=content of lithium metal after pre-treatment(g)/content of lithium metal before pre-treatment(g)×100.   [Equation 3]

The content of lithium metal before and after pre-treatment was determined by weighing through Microvalence (Mettler Toledo, XP105 model). In particular, weighing of lithium metal after pre-treatment was carried out after washing with dimethoxyethane and drying for accurate measurement.

TABLE 3

|  | Recovery ratio of lithium metal (%) |  | Recovery ratio of lithium metal (%) |
| --- | --- | --- | --- |
| Example 1 | 98.5 | Example 7 | 93.3 |
| Example 2 | 99.1 | Comparative Example 1 | 81.6 |
| Example 3 | 99.5 | Comparative Example 2 | 88.4 |
| Example 4 | 96.7 | Comparative Example 3 | 85.3 |
| Example 5 | 95.8 | Comparative Example 4 | 81.5 |
| Example 6 | 92.7 | Comparative Example 5 | 75.5 |

According to Table 3, when adjusting the current density, time period, and number of times in the stripping and plating steps under the conditions of Examples 1 to 7, more than 90% of lithium metal could be recovered after effectively removing the surface oxide film.

Experimental Example 2

Lithium metal was pretreated according to each of Example 1 and Comparative Example 5 and pre-treated lithium metal was photographed, and the results are shown in FIGS. 1 and 2.

Referring to FIG. 1, when pre-treating lithium metal according to Example 1, it was confirmed that lithium metal was sufficiently replenished in the plating step after the stripping step to form a relatively non-lustrous and uniform surface. In contrast to this, according to FIG. 2, when pre-treating lithium metal according to Comparative Example 5, it was confirmed that lithium metal was insufficiently replenished in the plating step after the stripping step to form a lustrous and uniform surface.

Experimental Example 3

In order to evaluate the performance of lithium secondary batteries after pre-treatment of lithium metal, after lithium metal was pre-treated according to Examples 1 and 2 and Comparative Examples 4 and 6, respectively, the capacity retention of the batteries was measured in each cycle while repeatedly charging/discharging the lithium secondary batteries, and the results are shown in FIG. 3. The charging/discharging of the lithium secondary battery was performed by sequentially repeating 3 cycles of 0.1C/0.1C charging/discharging, 3 cycles of 0.2C/0.2C charging/discharging, 10 cycles of 0.3C/0.5C charging/discharging, and 3 cycles of 0.2C/0.2C charging/discharging within the potential range of 1.5 V to 2.8 V (vs. Li/Li+).

Referring to FIG. 3, it was confirmed that the lithium secondary battery given in the pre-treatment process of lithium metal according to Examples 1 and 2 can effectively remove the surface oxide film formed on the surface of the lithium metal, and thus it has significantly improved lifetime characteristics as compared to the lithium secondary battery according to Comparative Example 6 which was not given in the pre-treatment process of lithium metal. In addition, it was confirmed that the lithium secondary battery given in the pre-treatment process of lithium metal according to Examples 1 and 2 has a high recovery ratio of lithium metal, and thus it likewise has significantly improved lifetime characteristics as compared to the lithium secondary battery given in the pre-treatment process of lithium metal according to comparative Example 4.

All variations and modifications of the present invention are intended to be within the scope of the present invention, and the specific scope of protection of the present invention will be clarified by the appended claims.

The invention claimed is:

1. A method for pre-treating lithium metal for a lithium secondary battery comprising:
    stripping a surface oxide film from a surface of the lithium metal by discharging the battery, and
    plating lithium metal on the surface of the lithium metal, from which the surface oxide film has been stripped, by charging the battery,
    wherein during stripping, the battery is discharged in a range of $6.0\times10^{-4}$ to $3.0\times10^{-2}$ of the electrochemical polishing stripping (ECPS) factor value represented by the following Equation 1:

ECPS factor(mA/cm²/s/n²)=current density(mA/cm²)/time period(s)/number of times(n))². [Equation 1]

2. The method for pre-treating lithium metal for the lithium secondary battery according to claim 1, wherein during stripping, the battery is discharged at a current density of 5 mA/cm² to 20 mA/cm².

3. The method for pre-treating lithium metal for the lithium secondary battery according to claim 2, wherein the discharging of the battery is performed 1 time to 13 times for a time period of 20 seconds to 120 seconds each time.

4. The method for pre-treating lithium metal for the lithium secondary battery according to claim 1, wherein during plating, the battery is charged at a current density of 0.01 mA/cm² to 0.2 mA/cm².

5. The method for pre-treating lithium metal for the lithium secondary battery according to claim 4, wherein during plating, the battery is charged 1 time to 13 times for a time period of 1,000 seconds to 7,000 seconds each time.

6. The method for pre-treating lithium metal for the lithium secondary battery according to claim 1, wherein the stripping and the plating are performed two or more times, the stripping and the plating are alternatively and sequentially performed the same number of times.

7. The method for pre-treating lithium metal for the lithium secondary battery according to claim 1, wherein a ratio of a current density during discharging during stripping and a current density during charging during plating is 50:1 to 200:1.

8. A method for pre-treating lithium metal for a lithium secondary battery comprising:
    stripping a surface oxide film from a surface of the lithium metal by discharging the battery, and
    plating lithium metal on the surface of the lithium metal, from which the surface oxide film has been stripped, by charging the battery,
    wherein a ratio of the electrochemical polishing plating (ECPP) factor value during discharging during stripping and the ECPP factor value during charging during plating is 1.3:1 to 1:1.3, and the ECPP factor value is expressed by the following Equation 2:

ECPP factor(mA·s/cm²)=current density(mA/cm²)·time period(s). [Equation 2]

9. A lithium secondary battery comprising lithium metal pre-treated by method for pre-treating lithium metal for the lithium secondary battery according to claim 1.

* * * * *